Nov. 17, 1970　　　　　　　H. HALPAAP　　　　　　　3,540,850
TEST FOR THE EARLY DIAGNOSIS OF PHENYLKETONURIA, LEUCINOSIS
AND HYPERVALINEMIA
Filed July 17, 1967　　　　　　　　　　　　　　　　3 Sheets-Sheet 2
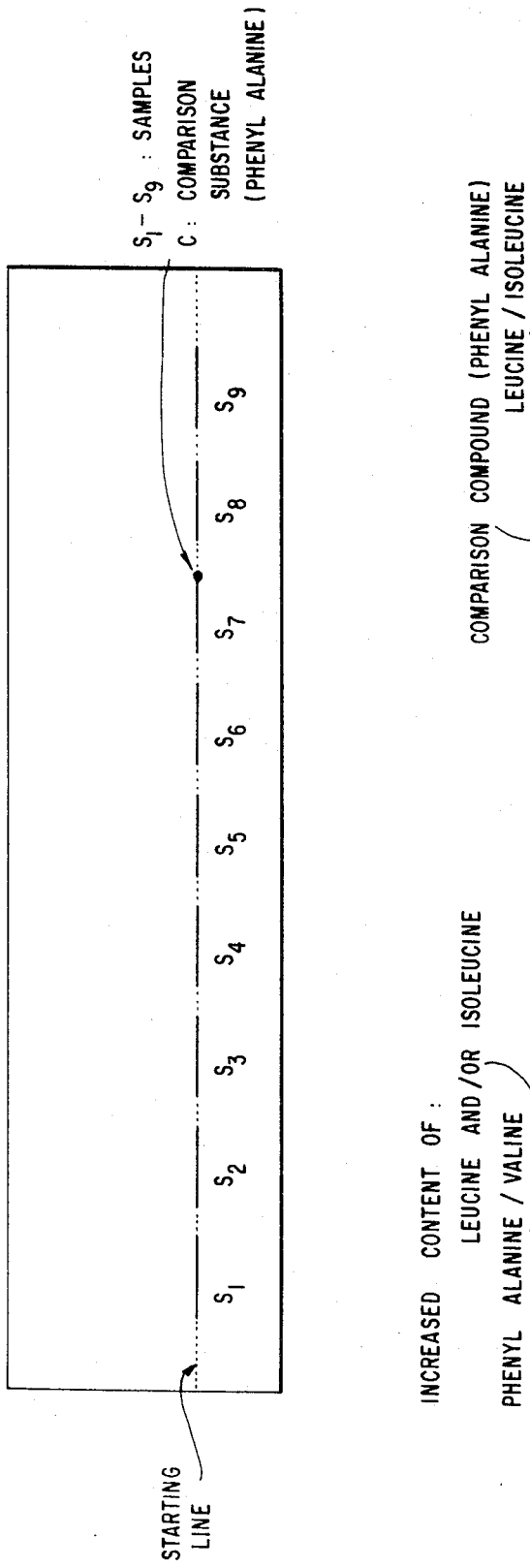
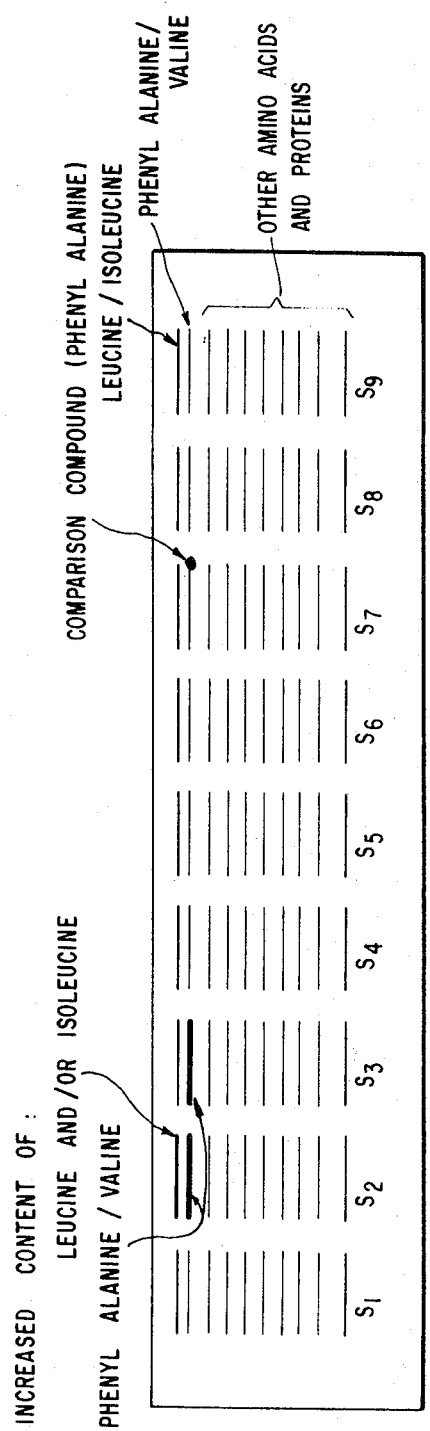
INVENTOR
HERBERT HALPAAP
BY *J. William Miller*
ATTORNEY

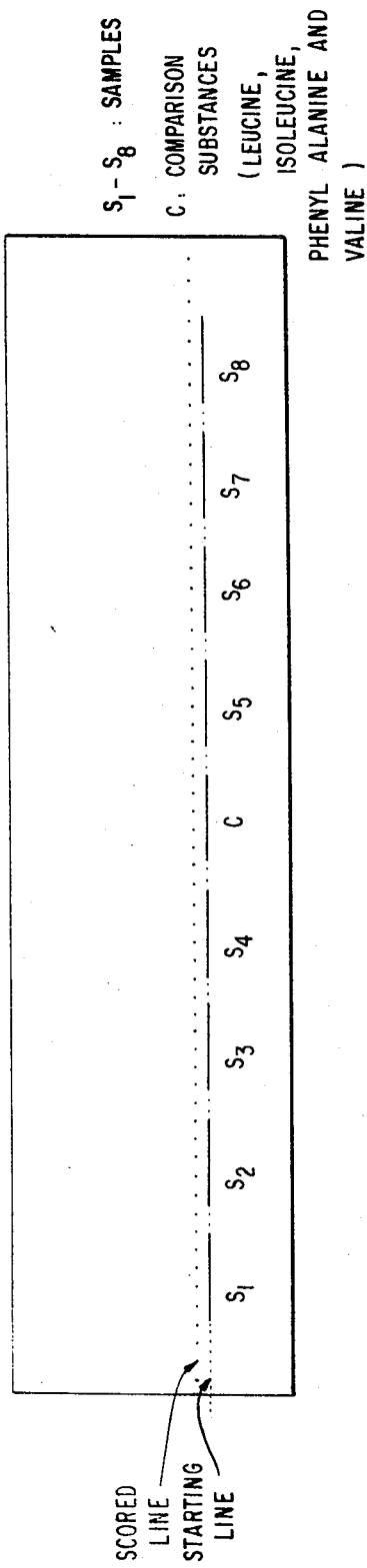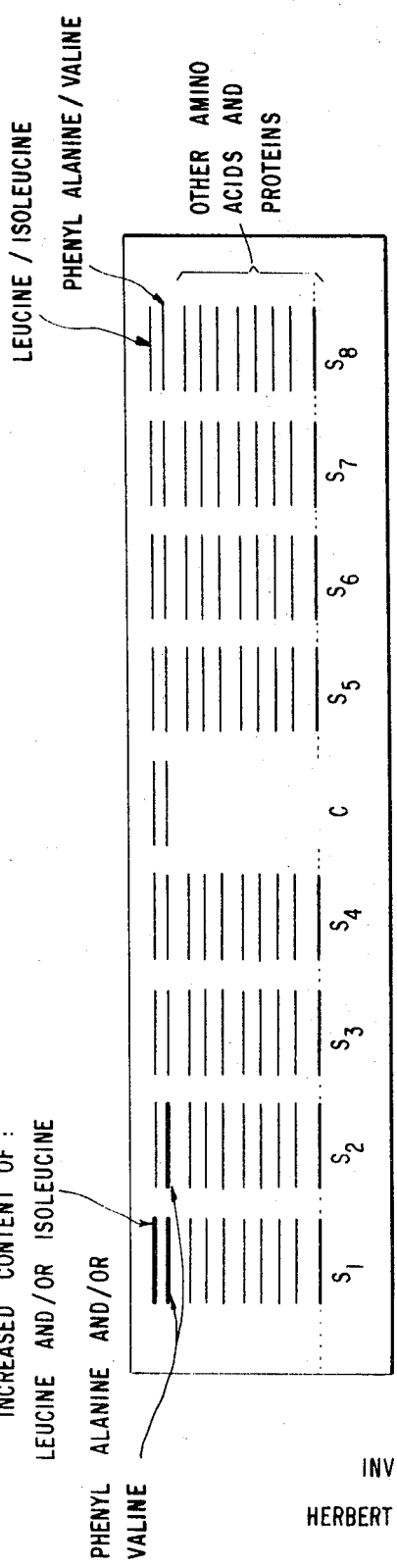

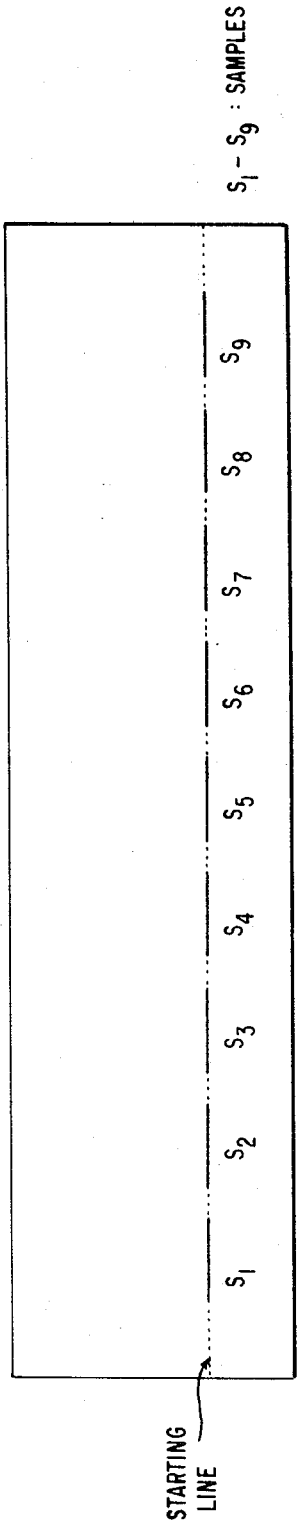
FIG. 3a — Chromatographic Plate (3) Before Use
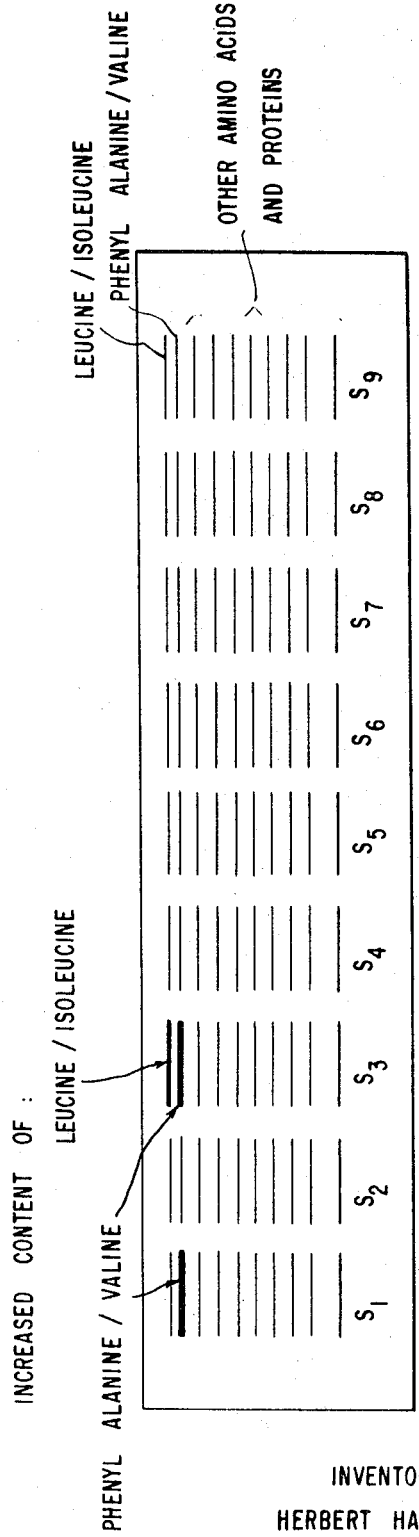
FIG. 3b — Chromatographic Plate (3) After Development
INVENTOR
HERBERT HALPAAP

3,540,850
TEST FOR THE EARLY DIAGNOSIS OF PHENYLKETONURIA, LEUCINOSIS AND HYPERVALINEMIA
Herbert Halpaap, Jugenheim, near Darmstadt, Germany, assignor to E. Merck A.G., Darmstadt, Germany
Filed July 17, 1967, Ser. No. 653,735
Claims priority, application Germany, July 16, 1966, M 70,261
Int. Cl. G01n *31/08, 33/16*
U.S. Cl. 23—230                 14 Claims

ABSTRACT OF THE DISCLOSURE

Thin-layer chromatography of body fluids provides a simple and rapid diagnostic for phenylketonuria, leucinosis, and hypervalinemia.

---

Applicant hereby claims the benefit of the filing date of German patent application M 70,261 of July 16, 1966.

This invention relates to a diagnostic test for specific diseases.

It is very important that the diagnosis of phenylketonuria, leucinosis, and hypervalinemia be made as early as possible, because these metabolic disorders are known to lead to irreversible damage even in the first weeks of life. An accurate early diagnosis of, in particular, phenylketonuria is particularly important since an effective, successful treatment can be achieved only by a suitable diet in the very first months or weeks of life. The relative frequency of occurrence of these diseases and the social significance thereof additionally underscore the necessity of diagnosing these diseases at an early stage.

Phenylketonuria is an enzymatic defect wherein, in the intermediate albumin metabolism, phenylalanine cannot be oxidized to tyrosine. Phenylalanine itself is not synthesized by the body, but is absorbed together with the albumins of food, particularly milk. Due to the defect, phenylalanine accumulates in the blood, whereby the further amino acid transport is disturbed and brain damage is incurred. By a few days after birth, the phenylalanine content in the blood rises to three to five times the normal value, and later to thirty times the normal value. By administering, as early as possible, a diet low in phenylalanine, the mental development of a child having phenylketonuria can proceed in a normal manner; otherwise, the child suffers irreversible brain damage.

Heretofore, three tests have been available for diagnosing phenylketonuria: (a) the ferric chloride test; (b) the agar diffusion test according to Guthrie; and (c) the fluorimetric determination according to McCaman-Robins.

Th ferric chloride test is based on a color reaction of phenylpyruvic acid in the urine, which acid is formed by the oxidative deamination of phenylalanine. However, phenylpyruvic acid is eliminated only at serum phenylalanine concentrations of between 10 and 20 mg./100 ml. (normal values: 1 to 2 mg./100 ml.). Therefore, the test yields a pathological result only in the third to sixth week of life and is therefore unsuitable for maternity wards where hospital resources could otherwise be expeditiously used for testing the infants. Also, the specificity of the ferric chloride test decreases after the administration of certain drugs. Thus. the measurement of phenylalanine increase in the blood is preferred as the diagnostic criterion. This increase reaches unequivocally higher values even a few days after birth. The increased value can be proven by the agar diffusion test or fluorimetrically in a drop of blood of the newborn.

The agar diffusion test of Guthrie is based on the principle that the growth of *Bacillus subtilis* in an agar medium is impeded by the addition of thienylalanine, and that this inhibition is counterbalanced by adding phenylalanine, phenylpyruvic acid, phenyllactic acid or proline. However, these determinations can only be conducted in central laboratories to which the blood samples, collected on a special filter paper, are forwarded. The same holds true for the fluorimetric method according to McCaman-Robins which, although developed into an automatic process (autoanalyzer), has not as yet been accepted in practice because of the expensive apparatus required.

Hypervalinemia is a disease due to the absence of valine transaminase. Heretofore, no rapid test has been disclosed for determining this disturbance.

Leucinosis likewise pertains to the primary hyperaminoacidurias. This disease occurs almost exclusively in infants within the first days of life and is due to the absence of branched-chain amino acid decarboxylases, whereby particularly leucine, isoleucine, and valine are accumulated in the blood. A rapid test for diagnosing this disease has not been descirbed heretofore.

An object of this inevntion is, therefore, to provide rapid tests for the aforesaid diseases.

Upon further study of the specification and claims, other objetcs and advantages of the present invention will become apparent.

To attain these objetcs, it has now been discovered that it is possible, in a single, rapid test, to determine phenylketonuria, as well as leucinosis and hypervalinemia. Using exteremely small amounts of serum, plasma or blood, these three diseases can be diagnosed with high specificity in the shortest period of time, without the use of highly costly apparatus or elaborate procedures.

The novel process comprises subjecting body fluids, such as serum. plasma or blood, to thin layer chromatography. After development, the thus-obtained zones of valine/phenylalanine and leucine/isoleucine are made detectable by a uniform distribution of color indicator to the thin layer or by making use of fluorescence indicators contained in the sorption agent. The intensities of the coloring or the fluorescence of the two zones are then compared with each other. For diagnostic screening purposes, it is sufficient to evaluate the relation of the color intensities or the degree of the fluorescence brightness or extinction of the two amino acid pairs with respect to each other. This comparison technique is thus simple and rapid.

In the normal serum, plasma or blood, the coloring, or the brightening or darkening of the fluorescence, of the leucine/isoleucine zones is somewhat more pronounced, or equally intense, as that of the valine/phenylalanine zones. An increase of phenylalanine or valine to less than double the normal values can be observed unequivocally. If this rapid test turns out to be positive and thus points to a possible phenylketonuria or hypervalinemia, then it is, of course, necessary—just as before—to determine the content of these amino acids more accurately before starting therapy, for example, by means of paper, thin-layer, gas, or column chromatography, or by fluorometry.

If, in case of approximately equal amounts employed, both zones of the amino acid pairs are colored clearly more vivid in comparison to the normal serum, plasma, or blood, or show markedly increased fluorescence brightness or extinction, then there is the suspicion of leucinosis. Also in this case, it is, of course, necessary to determine quantitatively the individual amino acids for the purpose of an accurate diagnosis. A comparison with the intensities of the respective amino acids from normal blood will always be readily possible, since this test is particularly suited for series determinations. According to previous experience with phenylketonuria, only about 1 child in 10,000 is the victim of this disease. Therefore, it can be assumed with a degree of probability bordering on certainty that when conducting several tests simultaneously, the colors of the normal values are likewise obtained.

In many instances, it is advantageous for determining the zones in question more accurately to run, simultaneously, leucine, isoleucine, valine and/or phenylalanine (in mixture or individually) in normal quantities, for comparison purposes. The position of the respective amino acids can then be determined more simply after the development, and any errors in technique during the development of the chromatogram are immediately apparent. However, in case of trained personnel, no standard of comparison is required for the coloring, because the differences with respect to the normal serum, blood, or plasma are conspicuous. Also, it is unnecessary to apply the comparison substances exactly in the "normal amounts," particularly since there is no agreement as yet in the literature on this field of art as to what amounts are exactly "normal."

After coloring, or during the check under UV light, there can be observed in the thin-layer chromatogram two immediately adjacent, but clearly separated bands, the upper zone consisting of leucine/isoleucine, and the lower zone being valine/phenylalanine. In the serum, plasma or blood, both zones are at the same level as the comparison substance(s).

Suitable sorption agents for the thin-layer chromatography to be conducted can be all those suitable for the separation of amino acids. In this class belong, for example, silica gels, aluminum oxides, kieselguhrs, magnesium silicates, calcium phosphates, sodium polyphosphates (sodium metaphosphate-Kurrol's salt), polyamides, polycarbonates, cellulose, cellulose acetates, cellulose ion exchangers, for example, cation exchangers, such as carboxy cellulose, carboxymethyl cellulose (CM-cellulose), phosphorylated cellulose (P-cellulose), sulfoethyl cellulose (SE-cellulose), or also anion exchangers, such as diethylaminoethyl cellulose (DEAE-cellulose), polyethylenimine cellulose (PEI-cellulose), guanidoethyl cellulose (GE-celulose), triethylaminoethyl cellulose (TEAE-cellulose), aminoethyl cellulose (AE-cellulose), p-aminobenzyl cellulose (PAB-cellulose), and ECTEOLA-cellulose. Moreover, it is also possible to employ ion exchange resins suitable for the separation of amino acids as the sorption agent (amino acid analyzer resins). All of these sorption agents can also be impregnated hydrophilically or lipophilically in a conventional manner, if this is desirable for special reasons. For this purpose, there can be employed, for example, buffer solutions, polyvalent alcohols, or paraffins. The preferred sorption agent is cellulose, particularly microcrystalline cellulose. There are commercially available several types of such microcrystalline celluloses for chromatographic purposes. Of course, mixtures of the above-mentioned sorption agents can also be employed. All sorption agents should be used in finely divided form, the particles having preferably a diameter of about 5–50, especially about $20\mu$.

It is also possible to add fluorescence indicators to the sorption agents if the zones of the two amino acid pairs are to be detected by fluorescence characteristics. It is most advantageous to use fluorescing organic compounds which are chemically bound to the respective sorption agent or adsorbed thereon, which compounds produce visible effects with the respective amino acids, either in long-wave ultraviolet by brightening, or in short-wave ultraviolet by extinction or decrease of fluorescence. This procedure prevents the indicators from being flushed out by the mobile phase (eluent). Particularly suitable indicators are those containing sulfonic acid groups and which are commonly known as optical brighteners. They are usually present in an amount of 0.01–5% by weight, calculated on the total weight of the sorption agent.

The sorption agent or agents applied in a conventional manner to substrates, are dried, and if desired activated. The layer thicknesses correspond to those usually employed for thin-layer chromatography processes and range between about 50 and $500\mu$, for cellulose preferably about $100\mu$. A preferred substrate for the sorption agents is glass. However, other substrates can also be employed, such as synthetic materials, e.g., plastics such as "Mylar" (polyethylene therephthalate), vinyl polymers, etc., in the form of foils or strips, metal plates or foils, or suitable paper types. The plastic foils in general have a thickness of about 50–$500\mu$, preferably $125\mu$. Particularly advantageous for purposes of the novel process of this invention is the use of prefabricated abrasion-resistant layers on thin glass plates. For obtaining the desired adhesion and abrasion resistance of the layers, it is, of course, possible to add materials to the sorption agents, if desired, which enhance the adhesion to the substrate and/or the abrasion resistance of the layer. Such additives have already been described in larger numbers, such as, for example, extremely finely divided $SiO_2$, aluminum oxides produced from alumogels, aluminum hydroxides produced from alumogels, carboxymethyl cellulose, gypsum, montmorillonite, vinyl polymers containing carboxyl groups, as well as polyacrylamides and polymethacrylamides, as well as mixtures thereof.

As the mobile phase for conducting the chromatographic separation, all those eluents can be employed which are conventionally used for amino acid separation processes. Particularly suitable for cellulose layers are, for example: ethanol/water; butanol/glacial acetic acid/water; methanol/water/pyridine; propanol/ammonia solution; and chloroform/methanol/ammonia solution. Preferred mobile phases for silica gels are, for example: propanol/water; propanol/ammonia solution; phenol/water; and pyridine/water. Additional suitable mobile phases or mobile phase systems are described in numerous examples in the literature, for example, in G. Pataki, "Dünnschichtchromatographie in der Aminosäure- und Peptidchemie" (Thin-Layer Chromatography in the Amino Acid and Peptide Chemistry) Walter de Gruyter & Co., Berlin, 1966.

If desired, a simple experiment can be employed to determine whether a certain mobile phase or mobile phase system is specific for the process of the present invention, i.e., whether a practicable separation of the two amino acid pairs involved herein can be accomplished.

If microcrystalline cellulose is used as the sorption agent, particularly favorable results can be obtained with ethanol having a water content of less than 30%, preferably with a content of about 80% ethanol, since this mobile phase produces a protein coagulation in the starting lines. However, such a coagulation is not absolutely necessary since the proteins, because of their higher molecular weight, travel more slowly and thus cannot interfere with the test.

The size of the plates or foils to be employed depends upon how many tests are to be conducted simultaneously in each particular instance. Assuming that normally at least two determinations are to be made simultaneously on one plate, the minimum length of the plate should be at least about 5 cm., preferably about 10 cm. The width should be about 5 cm., preferably. Of course, in case of series tests on a larger scale, longer plates can also be employed. The novel process can be conducted particularly simply when prefabricated glass plates of appropriate sizes are employed on which there are already applied, in an abrasion-resistant layer of microcrystalline cellulose, one or several comparison substances. If then, for example, the starting lines are additionaly clearly marked, a small amount of the fluid to be examined can at once be applied without difficulties, without having to adhere to an exact amount. The chromatogram can be developed immediately afterwards.

If the two zones containing the amino acid pairs are made recognizable by coloring, it is important to employ an indicator permitting an approximately equally vivid coloring of the two amino acid pairs. Particularly good coloring effects are obtained with neutral or weakly acidic, preferably acetic Ninhydrin indicators. However, it is, of course, also possible to employ other color indicators usually employed for amino acids, for example, isatin indicator, folic indicator, or Pauly's indicator (sodium sulfanilate+sodium nitrite). A comprehensive teaching of the composition and use of such indiactors can be found, for example, in G. Pataki, "Dünnschichtchromatographie in der Aminosäure- und Peptidchemie" (Thin-Layer Chromatography in the Aminoacid and Peptide Chemistry), Walter de Gruyter & Co., Berlin (1966).

It proved to be suitable to apply the fluids to be examined in the form of starting lines, not in the form of dots. From the preparative layer chromatography, it has been known already that the separation of bands is accomplished more successfully than the separation of individual spots of substances. Particularly good results are obtained in the novel test according to this invention when the starting lines of each serum sample have a length of about 0.5 to 5 cm., preferably about 2 cm. The starting line is preferably about 15 mm. above the lower edge of the plate. An amino acid which, if desired, is employed together with the testing substances as a control, can, however, also be applied in the form of a dot just as well.

If the thin-layer chromatography is conducted in two stages, particularly favorable effects are obtained. In the first stage, the mobile phase or mobile phase system is employed in a conventional manner. As soon as the mobile phase has traveled to a certain, suitably predetermined line above the starting line (for example, 3 cm. above the starting line), the plate is taken out of the development chamber and dried. Thereafter, a second thin-layer chromatography is conducted with the same mobile phase, or another one. After the second development has been completed, the thin-layer chromatogram is treated in a conventional manner and, if desired, colored. After drying—in case the chromatogram was colored—there can be observed violet-colored zones on the sorption agent layer, caused by the amino acids. These zones can be evaluated, of course, visually as well as photometrically, in a conventional manner. If the evaluation is to be conducted on the basis of the change in fluorescence, the developed plate is observed either under long-wave (366 m$\mu$) or under short-wave (254 m$\mu$) ultraviolet light. The evaluation can be conducted visually or with the aid of a spectrophotometer with fluorescence evaluation, containing an attachment for thin-layer chromatogram plates. In case of a positive reaction, one or both of the zones show a marked brightening, or a decrease or extinction of the fluorescence, as compared to the control values.

In many cases, particularly favorable results can be obtained by separating from the remaining layer, after the first stage of the chromatography procedure, the proteins which remain in the starting line along with the strongly polar amino acids, e.g., lysine and ornithine. This can be done, for example, by immersing the plate up to the level of the original starting line into the mobile phase, or by creating a discontinuity in the layer of sorption agent by making a score therein a little above the starting line. However, it is also possible to produce the substrate carrying the sorption agent, preferably a glass plate, in such a manner that the glass is scored at this place. Subsequently, after the first stage of chromatography, the portion of the substrate with the corresponding layer of sorption agent can readily be broken off and discarded. If foils are used as the substrate, the portion which is no longer desired can also be simply cut off. If the layer of sorption agent is divided by the removal of a thin strip above the starting line, it is, of course, necessary to adjust the level of mobile phase in the development chamber so that it is correspondingly higher for the second stage of the chromatography procedure.

It is to be emphasized at this point that a two-stage chromatography process is optional. Sufficiently accurate results are also obtained by judging the hues, or the changes in fluorescence of the bands obtained after only one run of the mobile phase. The structure of the bands per se and the boundaries of the individual amino acid pairs with respect to each other are, however, always more pronounced when the development is conducted twice.

The chromatographic process conducted in accordance with the present process represents a novel method for the deproteinization of serum or plasma, respectively, or blood, with simultaneous extraction and separation of the respective amino acids. When it is desired to determine amino acids in biological fluids, it is otherwise first necessary to remove the interfering substances, i.e., particularly salts and proteins. In this connection, in all conventional precipitation reactions with acetone, picric acid or trichloroacetic acid, losses in amino acids occur. Aside from such losses, there are entailed several additional steps due to dilution of the sample, filtering or centrifuging, and renewed concentrating. The free amino acids per se cannot be extracted at all, but only in the form of ether-soluble derivatives. The steps of deproteinizing serum, plasma or blood directly on the layer, simultaneously extracting the desired free amino acids quantitatively and optionally completely removing the interfering proteins and more strongly polar amino acids by separation of the starting line have not yet been described heretofore and are of a particularly great advantage. Never before such a test could be conducted without deproteinizing the body fluid prior to the determination of the amino acids.

For testing with the aid of the novel process, it is preferred to employ serum, plasma, or blood mixed with anticoagulants. Normally, 1 to 3 $\mu$l. of these fluids are sufficient for conducting the chromatography. With respect to the technique of preparing the body fluids, conventional methods are employed as described, for example, by R. J. Henry in Clinical Chemistry, Hoeber Medical Division, 1964, page 154, or in "Syllabus of Laboratory Examinations in Clinical Diagnosis," Harvard University Press, Cambridge, 1962, page 22.

The novel test exhibits the considerable advantage that none of the individual amino acids needs to be determined, but that only the coloring of the adjacent amino acid pairs must be compared after the chromatographic separation. Thus, no outside standard has to be employed, and only an inherent, internal standard is referred to. This procedure is acceptable and even desirable for a screening test of about 1:10,000. An additional, very desirable advantage resides in the fact that it is unnecessary to apply exact amounts of serum, plasma or blood. Depending upon the amounts of fluid available, it is possible to vary same within wide limits. Also, the fluids to be employed simultaneously on a single thin-layer chromatogram need not be used in exactly identical amounts.

The determinations according to the novel process of this invention can be conducted in any clinical laboratory within about ½ hour, the expenditures in apparatus and materials being minimal. Practically any number of tests can be conducted simultaneously.

The specificity of the test is at least as great as that of the conventional agar diffusion test or the conventional fluorimetric method. Moreover, it is possible for the first time by means of this novel method to observe three different disorders simultaneously, which is of particular significance in view of the large number of necessary tests for every newborn baby.

In any normal serum, the relationship of the two amino acid pairs with respect to each other is rather constant, whereas the total content of these amino acids varies quite markedly in some instances. According to the present invention, it is readily possible to record any change in the quantitative proportion of the two amino acid pairs.

In this connection, the change of this quantitative ratio is generally of much more importance for the determination than the amounts ascertainable according to the conventional methods. Therefore, the novel test permits usable observations to be made, even where erroneous results are liable to be obtained by other methods. This is particularly the case when the total content of the individual amino acids is anomalous, but where the relationship of the two amino acid pairs of leucine/isoleucine and valine/phenylalanine is quite definitely within the normal values, thus indicating that no disease is present.

The process according to the present invention is not only of importance for series determinations in clinics for newborn, but also for tests on mentally ill adults. The reasons for the mental illness, as heretofore mentioned, can be clearly diagnosed by means of the novel process. Moreover, it becomes important to test also heterozygote pre-disposed persons, so that the tests of this invention are also useful for testing parents in order to detect the possible presence of a corresponding hereditary factor in their children as early as possible. This makes possible the timely taking of appropriate corrective steps.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

For testing two samples, a glass strip of a thickness of about 1 mm., a length of 10 cm., and a width of 5 cm., coated with a layer of about $100\mu$ of a microcrystalline TLC-cellulose ("Avicel") is employed. At a spacing of 1.5 cm. from the lower edge, there are three marked starting lines, each of 2 cm. in length, the central starting line being spaced 1 cm. from each of the others. The glass has been scored beforehand 18 mm. above the lower edge, i.e., 3 mm. above the starting lines. On the central starting line, a phenylalanine comparison standard of about 0.1 $\mu$g. is applied (1 $\mu$l. of a solution containing 100 mg. phenylalanine/100 ml.).

By means of a capillary tube of an inner diameter of about 1 mm., approximately 2 $\mu$l. of each of two different serum samples from infants are applied by spreading these samples, respectively, on the two remaining starting lines. After drying in air for about 1 minute, the test strip is placed vertically into an appropriate separating chamber filled to a level of about 0.5 cm. with approximately 80% ethanol; then, the chamber is closed off by a lid placed loosely thereon. As soon as the mobile phase has risen to a marked line having a distance of 0.5 cm. from the upper edge (about 10 minutes), the test strip is removed, dried in air, and then the pre-scored strip is broken off. The remainder of the TLC (thin-layer chromatography) plate is again placed into the separating chamber and again developed up to about the same level (about 5 minutes). After drying, the plate is immersed in a neutral or acetic acid-containing ninhydrin solution (or this solution is sprayed on the plate), dried in air and heated for a few minutes to about 60° C. Generally, slightly acidic ninhydrin solutions (for example those containing about 0.1% glacial acetic acid) are preferred for the coloring of amino acids.

The violet-colored bands of the amino acid pairs are positioned closely together one below the other. The lower band (about 7 mm. from the upper edge) contains valine+phenylalanine, the upper band (about 4 mm. from the upper edge) contains leucine+isoleucine. In the normal case, which is present here, the violet shades of the two bands are approximately the same.

EXAMPLE 2

Five samples (2 $\mu$l. of each) of citrated blood from adult humans are tested, analogously to Example 1, on glass plates having a thickness of 1 mm., a length of 20 cm., and a width of 5 cm.

As a comparison, a mixture of leucine, isoleucine, valine and phenylalanine is applied to a central starting line in the quantitative ratio of normal serum, i.e., normal serum for human adults: leucine 2.1; isoleucine 2.1; valine 3.4; phenylalanine 2.7 mg./100 ml.

After the first chromatography step, the plate is dried within about 5 seconds with the aid of a fan, and then, without separating the starting lines, returned to the separating chamber and chromatographed a second time for about 10 minutes with the same mobile phase. After conventional treatment, the violet bands of the amino acid pairs become visible at a spacing of 8 mm. (valine+phenylalanine) and 5 mm. (leucine+isoleucine), respectively, from the upper edge. One of the five samples exhibited a color intensity which was 10 to 20 times more vivid in the lower band (valine+phenylalanine). An additional examination conducted after this test did not yield any increase in the valine content, which would have pointed to hypervalinemia, but it did show an increase int he phenylalanine content which was found in an amount of 43 mg./100 ml. This value is 16 times higher than the corresponding normal value (2.7 mg./100 ml.), so that genuine phenylketonuria was present in this case. This finding could be confirmed by other tests and further examinations.

EXAMPLE 3

Analogously to Example 1, ten serum samples of infants are chromatographically separated on 5 plates. As a comparison substance, a comparative mixture of the four amino acids in question (leucine 2.1; isoleucine 2.3; valine 4.9; phenylalanine 1.3 mg./100 ml.) corresponding approximately to the normal values present in infants is applied along a length of 2 cm. The plates are developed simultaneously in a separating chamber wherein they are arranged at a spacing of about 1 cm. from one another, one behind the other. After the second chromatography stage has been completed, the two amino acid pairs are found at a spacing of 5 mm. and 8 mm., respectively, from the upper edge. The intensity of the two color bands is determined with the aid of a spectrophotometer having an attachment for thin-layer chromatography plates. Since the serums stem from healthy infants, no differences are observed in the color intensity of the serums, neither with respect to each other nor in comparison with the control mixtures.

EXAMPLE 4

Analogously to Example 1, two samples of infant's serum are applied, one sample corresponding to a normal serum, and the other sample being normal serum having been mixed beforehand with additional amounts of the amino acids, namely, with 190 $\mu$g./1 ml. leucine, 210 $\mu$g./1 ml. isoleucine, and 440 $\mu$g./1 ml. valine. These additions correspond to ten-fold the normal amount present in the serum. The few cases of leucinosis previously observed and evaluated range even substantially higher, at least with respect to the leucine and isoleucine contents.

After coloring, there is observed in the pretreated serum sample a markedly increased color intensity as compared to the normal serum, in both zones, but predominantly in the upper zone.

EXAMPLE 5

2 $\mu$l. of each of four samples of citrated blood from adults and of one sample previously mixed with 270 $\mu$g./10 ml. phenylalanine are examined by thin-layer chromatography analogously to Example 2. After coloring, the pretreated sample, possessing only double the content of phenylalanine in comparison to the normal value, exhibits a markedly increased color intensity as compared to the other samples in the lower zone.

EXAMPLE 6

The test samples of Example 5 are chromatographed on a glass plate coated with a layer of silica gel. The plate has a thickness of about 1 mm., a length of 10 cm., and a width of 5 cm. and is coated with a layer of 250μ thickness. The silica gel has a grain size below 0.08 mm., and contains about 2% by weight of a high molecular carboxyvinyl polymer (being marketed as Carbopol®) as binder and about 2% of a manganese activated zinc silicate as fluorescent indicator.

The mobile phase is ethanol/water in a ratio of 80:20 and the chromatography is conducted in two stages by breaking off the pre-scored lower part of the chromatoplate after the first stage. After spraying with ninhydrin solution containing 0.1% glacial acetic acid, the same results are obtained as described in Example 5.

EXAMPLE 7

A chromatography with the test samples as described in Example 5 is carried out with a chromatoplate consisting of a polyethylene terephthalate film (same dimensions as the glass plates) having a thickness of 125μ and being coated with a layer of microcrystalline cellulose with a thickness of 100μ. The development is performed in two stages. After the first stage, the film is cut off 3 mm. above the starting lines.

Coloring is also effected with acidic ninhydrin solution. The same results are obtained as described in Example 5.

The enclosed FIGS. 1 to 3 show more preferred forms of chromatographic plates according to the invention before and after use.

FIG. 1a shows a chromatographic plate before use with a series of samples ($S_1$ to $S_8$) and a comparison mixture (C) of valine, phenylalanine, leucine and isoleucine. The dotted line represents the scored line as herein described.

FIG. 1b shows the same plate after development. The pathological sample $S_1$ has an increased content of leucine and/or isoleucine and phenylalanine and/or valine. The pathological sample $S_2$ has an increased content of phenyl alanine and/or valine. Other amino acids and proteins, contained in the samples, are separated from these amino acids by the chromatographic development.

In the applied comparison substance one or more of the comparison compounds of FIG. 1 may be deleted. FIG. 2 shows a chromatographic plate corresponding to the plate of FIG. 1, however, only containing phenyl alanine as comparison compound. Instead of phenyl alanine one of the other amino acids, used in the plate FIG. 1 may be applied, too.

As another variation a comparison mixture consisting of leucine, isoleucine, and valine can be used. This comparison mixture is especially suitable for a diagnostic process for determining the presence of leucinosis in body fluids. Furthermore another mixture of 3 of the amino acids or a mixture of 2 amino acids used in the plate of FIG. 1 as comparison substances may be applied as comparison compounds.

FIGS. 3a and 3b show a chromatographic plate with a series of samples on which no comparison compound is applied. An increased content of leucine/isoleucine and phenyl alanine/valine in pathological samples ($S_1$ and $S_3$ in FIG. 3) is determined by comparison with the intensity of the corresponding lines of the other normal samples after development. The majority of the samples show normal intensities.

The arrangement of the samples and comparison compounds on the starting line in the plates of FIGS. 1 and 3 may be varied. E.g., the comparison substance(s) may be arranged as a line of suitable length (FIG. 1a) or in form of dots (FIG. 2a). In some cases it is especially advantageous to arrange the dot of a comparison compound on the line of a sample.

Besides, the number of the samples on a plate may be varied, for instance between 2 and 12, and of course, the form of the plates and their length and width may also be varied.

As indicated above, the chromatographic plates FIGS. 1 to 3 preferably may be scored above the starting line. After a first development this special form of plates is divided at the score. In this case the plates of FIGS. 1b, 2b, and 3b no more contain their original lower part with the starting line.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitable, and intended to be, within the full range of equivalence of the following claims.

What is claimed is:

1. A diagnostic process for determining from body fluids the presence of at least one of phenylketonuria, leucinosis and hypervalinemia, which process comprises:
   (a) chromatographing on a supported sorption agent a body fluid selected from the group consisting of serum, plasma and blood without prior deproteinization;
   (b) making recognizable resultant zones of (i) valine and phenyl alanine, and (ii) leucine and isoleucine by treatment with indicating means selected from the group consisting of (I), an indicator coloring both pairs of these amino acids with about equal intensity, and (II) a fluorescent indicator incorporated in the sorption agent; and
   (c) comparing the intensities of color or fluorescence, respectively, of the two zones with each other or with a control.

2. A process according to claim 1 wherein the indicator is a member selected from the group consisting of a neutral ninhydrin indicator and a weakly acidic ninhydrin indicator.

3. A process according to claim 1 wherein the sorption agent is microcrystalline cellulose.

4. A process according to claim 1 wherein the control consists of a composition containing at least one amino acid selected from the group consisting of valine, phenyl-alanine, leucine, and isoleucine in a concentration of about 0.05 microgram of each amino acid employed.

5. A process according to claim 4 wherein the control contains valine, phenylalanine, leucine and isoleucine.

6. A process according to claim 1 wherein the body fluid is applied for chromatographing in the form of starting lines of a length of 0.5–5 cm.

7. A process according to claim 6 wherein the starting lines are about 2 cm. long.

8. A process according to claim 1 wherein the chromatogram is developed by chromatographing in two stages.

9. A process as defined by claim 1, further comprising the step intermediate said two stages of forming a discontinuity throughout a complete cross section of said sorption layer above and proximate the starting position so that on subsequent development, protein phase remaining at the starting position cannot migrate into the remaining chromatoplate, thereby avoiding any protein interference with the development of the amino acid chromatogram.

10. In a two-stage process comprising the separation of amino acids from a body fluid selected from the group consisting of blood, serum, and plasma, and wherein said body fluid is subjected to thin layer chromatography without first separating protein therefrom, the improvement comprising the step intermediate said two stages of forming a discontinuity throughout the complete cross section of said sorption layer above and proximate the starting position so that on subsequent development, protein phase remaining at the starting position cannot migrate into the remaining chromato-plate, thereby avoiding any protein interference with the development of the amino acid chromatogram.

11. A process as defined by claim 10 wherein at least one said amino acids is selected from the group consisting of valine, phenylalanine, leucine, and isoleucine.

12. A process as defined by claim 10 wherein said discontinuity is formed 3 millimeters above the starting position.

13. A chromato-plate comprising a glass substrate and a layer of sorption material superimposed thereon, said glass substrate being scored above the starting line to facilitate breaking and removal of the lower part of the plate after the first stage of a two stage development of the chromatogram.

14. A chromato-plate as defined by claim 13 wherein the glass is scored about 3 millimeters above the starting line.

References Cited

UNITED STATES PATENTS 3,399,971　9/1968　Kita.

OTHER REFERENCES

Pasieka et al., Anal. Chem. 28, No. 12, December 1956, pp. 1964–1966. Smith, I., Chromatographic Techniques, Interscience Publishers, Inc.; p. 100.

Randerath, K., Thin-Layer Chromatography, Academic Press, p. 4 and Fig. B facing p. 4, 26, 39, 41, 45, 46, 190 relied on.

MORRIS O. WOLK, Primary Examiner

R. M. REESE, Assistant Examiner

U.S. Cl. X.R.

23—253; 260—527; 424—7

UNITED STATES PATENT OFFICE
CERTIFICATE OF CORRECTION

Patent No. 3,540,850                    Dated July 17, 1967

Inventor(s) HERBERT HALPAAP

It is certified that error appears in the above-identified patent and that said Letters Patent are hereby corrected as shown below:

Column 10, Line 58, change "claim 1" to ---claim 8---

Signed and sealed this 27th day of April 1971.

(SEAL)
Attest:

EDWARD M. FLETCHER, JR.                WILLIAM E. SCHUYLER, JR.
Attesting Officer                      Commissioner of Patents